United States Patent
Striebel et al.

[15] 3,656,979
[45] Apr. 18, 1972

[54] WATER-REPELLENT CEMENT AND SOILS

[72] Inventors: Wilhelm K. Striebel, Ginsheim; Werner Loch, Neubeckum/Westphalia, both of Germany

[73] Assignee: Dyckerhoff Zementwerke Aktiengesellschaft, Wiesbaden-Amoneburg, Germany

[22] Filed: Jan. 6, 1969

[21] Appl. No.: 789,372

[30] Foreign Application Priority Data

Jan. 8, 1968    Germany .................P 16 46 502.4

[52] U.S. Cl. .............................. 106/95, 106/90, 106/287 SS, 106/314
[51] Int. Cl. ....................................................... C04b 13/24
[58] Field of Search ........................... 106/90, 95, 314

[56] References Cited

UNITED STATES PATENTS

| | | | |
|---|---|---|---|
| 2,996,394 | 8/1961 | Stoll | 106/95 |
| 2,491,487 | 12/1949 | Faulwetter | 106/90 |
| 2,313,109 | 3/1943 | Wertz | 106/95 |
| 2,305,113 | 12/1942 | Scripture | 106/95 |
| 2,170,434 | 8/1939 | Seigle | 106/95 |
| 1,957,415 | 5/1934 | Wechter | 106/95 |
| 1,912,626 | 6/1933 | Drexler et al. | 106/90 |
| 1,599,903 | 9/1926 | Lord | 106/95 |
| 1,076,028 | 10/1913 | Ellis | 106/95 |

OTHER PUBLICATIONS

Lea & Desch, " The Chemistry of Cement and Concrete," Edie, Arnold & Sons, pgs. 518, 519 & 520 (1956).
Taylor, W. H., " Concrete Technology and Practice," American Elsevier, pages 366–367, (1965)

*Primary Examiner*—James E. Poer
*Assistant Examiner*—W. T. Scott
*Attorney*—McClure, Weiser and Millman

[57] ABSTRACT

A hydrophobic cement especially suited for soil stabilization which comprises a certain amount of a mixture of tertiary, saturated, aliphatic monocarboxylic acids of certain carbon atom content. The improved stabilized soils comprising the cement.

6 Claims, No Drawings

WATER-REPELLENT CEMENT AND SOILS

Soil consolidation or stabilization increases the load carrying capacity of a soil so that the soil is capable of withstanding the stress which is due to the traffic load and weather. The load carrying capacity of a soil can be increased either by admixture of other suitable soil types which have the desired characteristics or by mixing with cement. After mixing the soil must be consolidated or compacted while maintaining the optimum water content determined by soil-physical testing. One of the most important tests used for this purpose is what is known as the Proctor test which determines the relationships between the water content and the dry density of a disturbed soil during constant consolidation work. The highest dry density which can be achieved in this test is referred to as the Proctor density and the associated water content is referred to as the most favorable or optimum water content.

When consolidating or stabilizing a soil with cement, sufficient cement is admixed with the soil so that the layer which has been stabilized by hardening of the cement remains stable even under the action of water and frost. Thus, resistence to frost is required in addition to stability or strength.

In non-cohesive soils having no or only a small proportion of constituents of less than 0.06 mm., the granules are in contact with one another and frictional forces prevail at their points of contact, the magnitude of which is dependent upon the pressure. When stabilizing soils of this kind, a high degree of compaction or a small volume of pores must be aimed at. The cement has the function in this case to cement the points of contact of the individual grains together and fill the pore space.

In the case of cohesive soils which have no supporting structure, the carrying capacity is predominantly due to cohesion. Since cohesion varies as the water content of the soil varies, a cohesive soil has essentially no more load carrying capacity at a high water content. When stabilizing such soils with cement, the hardened cement coats the soil crumbs formed on mixing and cements the same together. Due to the coating, the soil crumbs are enveloped by a hard cement shell which has the function of preventing water from penetrating into the interior of the soil crumb. Insufficient layer thickness and strength of this cement shell entail the risk of water penetration and that the cement shell is burst by the swellable components of the soil. Losses in stability or strength occurring in practice are due to such subsequent destruction of the cement shell.

Commercially available cements of standard classes Z 275, Z 375 and Z 475 have been used to stabilize non-cohesive and cohesive soils. However, these cements do not meet all the requirements to be fulfilled in soil stabilization. Stabilization of uniform sands having a non-uniformity co-efficient $$\frac{\text{grain diameter at which } 60\% \text{ of grains pass the sieve}}{\text{grain diameter at which } 10\% \text{ of grains pass the sieve}} < 5$$

and of cohesive soils has been found to be either impossible or only possible with the incorporation of very large amounts of cement.

It is known to add water-repellent materials to cement in cement production to improve the stability of finely ground cement in storage so that it can be stored unprotected in bags at the construction site without deteriorating. Various carboxylic acids or salts thereof also in mixture with fats, phenols, etc., have been proposed as agents providing water-repellency. See German patent publication DAS 1,239,605. When using these hydrophobic cements for soil stabilization, the effect of the additives is not always satisfactory chiefly because natural fatty acids or derivatives thereof are degraded in the soil by bacteria.

It is an object of the present invention to provide a water-repellent cement which is suitable for soil stabilization.

The present invention provides a hydrophobic cement which comprises a highly branched and predominantly tertiary, saturated, aliphatic monocarboxylic acid having from 5 to 20, and especially from 9 to 11 carbon atoms in the molecule. The content of acid is in an amount of from 0.05 to 2% by weight, preferably 0.1 to 0.5% by weight.

The above-mentioned saturated predominantly tertiary monocarboxylic acids having 9, 10 and 11 carbon atoms including the carboxyl group in the molecule are prepared from olefins, water and carbon monoxide under the action of strong acids. The carboxyl group has a tertiary bond in 90% of the acid mixture and a secondary bond in 10% of the acid mixture. Its structure corresponds to the general formula

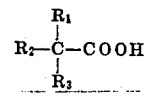

In substantially all cases, at least one of the three side chains R is a methyl group. All of the three side chains are predominantly unbranched. A minor portion of the tertiary acids may have cyclic hydrocarbon structures among which five-membered rings occur preferentially.

It has been found surprisingly that the above-mentioned monocarboxylic acids which are predominantly tertiary combine a very satisfactory water-repellent effect with outstanding properties when used as additive in soil stabilization. They are not attacked by bacteria in the soil. Stability is developed rapidly and the stabilized soil retains its stability and frost resistance even over extended periods of time.

Since hydrophobic cements generally have a tendency to form dust more readily than a portland cement ground to the same particle size, it is desirable to add paraffin oil or wax in amounts of 0.1 to 0.3% by weight to minimize dusting.

The special cement according to the invention can be produced by grinding together the portland cement clinker with the additives in the cement mill or by subsequent admixing, especially by spraying the synthetic fatty acids onto the ground cement.

The advantages of the cement of the invention which is ideally suited for soil stabilization will be illustrated by the non-limitative example given hereafter.

A PZ 375 cement and a cement according to the invention having added thereto 0.2% of a mixture of tertiary monocarboxylic acids having from 9 to 11 carbon atoms, sold under the trade name Versatic 911, were tested. When tested according to DIN 1164, these cements had the following properties:

TABLE I

Comparative Properties of Cements

| Cement | | PZ 375 | PZ with Additive |
| --- | --- | --- | --- |
| Specific surface area, | sq.cm./g. | 3,350 | 3,330 |
| Setting | | | |
| beginning | hours | 2³⁰ | 2⁴⁰ |
| end | hours | 3¹⁵ | 3³⁰ |
| Flexural tensile strength/ compressive strength | | | |
| 3 days | kp./sq.cm. | 7/267 | 61/275 |
| 7 days | kp./sq.cm. | 75/387 | 83/398 |
| 28 days | kp./sq.cm. | 86/474 | 82/473 |

It is apparent from the above data that the treated cement has highly satisfactorily rapid setting properties, and the requisite strength properties.

Likewise, when 0.05, 0.5, 1 and 2% by weight of such mixture of acids is incorporated into portland cements PZ 275 and 475, the treated cement has satisfactory properties.

The above prepared two cements were used to stabilize two types of soil, viz. a sandy soil having a non-uniformity coefficient of 2.5 and a cohesive soil. The amount of cement added was 10% by weight, in each case corresponding to a cement consumption of 25 kgs./sq.m. with a layer depth of 15 cm.

TABLE II

Compressive Strengths of the Stabilized Sandy Soil

| Cement | 7 days kp./sq.cm. | 28 days kp./sq.cm. |
|---|---|---|
| PZ 375 | 47 | 58 |
| PZ with additive | 59 | 74 |

TABLE III

Compressive Strengths of the Stabilized Cohesive Soil

| Cement | 7 days kp./sq.cm. | 28 days kp./sq.cm. |
|---|---|---|
| PZ 375 | 37 | 52 |
| PZ with additive | 45 | 67 |

The data shows that with the cements according to the invention, the compressive strength of both soils is increased by about 30%, when adding the same amount of cement.

Freeze-thaw tests carried out according to ASTM D-560 on 7 cm. cubes showed the following results after 25 freeze-thaw cycles.

TABLE IV

| Cement | Loss in Weight sandy soil | Loss in Weight cohesive soil | Compressive Strengths sandy soil kp./sq.cm. | Compressive Strengths cohesive soil kp/cm² |
|---|---|---|---|---|
| PZ 375 | 18% | 26% | 22 | 14 |
| PZ with additive | 2% | 3% | 68 | 62 |

After the freeze-thaw treatment, the decrease in compressive strength with the use of PZ 375 was 62% and 73%, respectively. With the cement according to the invention, the loss in strength was only 8% and 7%, respectively.

The data also shows greater stability of the soils, as evidenced by smaller loss in weights, even for the cohesive soil.

It is apparent that soils stabilized with the cements of the invention possess increased compressive strength, stability, in particular to water, and freeze and thawing conditions. Also, a soil having a non-uniformity coefficient of less than 5 has been satisfactorily stabilized.

In case of the soil stabilized with the hydrophobic cement, the cement shells mentioned above prevented water from penetrating into the core while water penetrated through the untreated portland cement shells, which bursted by swelling of the soil core.

Similarly improved results are obtained when cements have incorporated therewith a mixture of tertiary acids of a carbon atom content of eight to 14.

The examples illustrate the importance of the hydrophobic property of the cement and how necessary it is that it be not eliminated by the influence of bacteria.

The cement produced in accordance with the invention is characterized by improved stability in storage when compared to other cements. When examining the storage stability by determining the loss on ignition of the cement having been stored in open dishes and at high humidity of the air, the cement according to the invention has an increase in loss on ignition of 1.45% after a storage time of six weeks while the PZ 375 stored under the same conditions exhibits an increase in loss on ignition of 14.8%, after as little as five weeks.

The amount of treated cement incorporated into the soil is dependent on the intended magnitude of effect desired on the treated soil; amounts less than 10% by weight such as 1% or greater like 20%, if necessary, may be used too.

The above-mentioned acids used in the present invention are readily obtainable commercially, such as acids mixtures from the "OXO," or "OXYL" process. The acid mixture is such that as an average it comprises about 90% of tertiary acids and 10% secondary acids. Preferably at least 75%, especially at least 85% of the acids have straight chain $R_1$ to $R_3$ groups.

For suitable acid mixtures as are obtainable from the aldehydes and other products of the "OXO" process, or alcohols by the "OXYL" process, see Encyclopedia of Chemical Technology Kirk-Othmer, hereinafter cited as Kirk-Othmer, Vol. 9, p. 699 and 2nd. Supp. Vol., p. 548.

The acid mixtures specified above can be used, in accordance with this invention with any desired cement, especially of the portland type, as disclosed in Kirk-Othmer at pages 684–690 et seq. These cements are designated by ASTM specification C 150–63. Said references are incorporated herein by reference.

In the mixture of acids the carbon atom content refers to the "average" carbon atom content for the entire mixture of acids.

In the above specification the following abbreviations have the following meaning:
PZ 375, PZ 275 and PZ 475:
DIN 1164:

We claim:

1. A hydrophobic inorganic portland cement of improved compressive strength suitable for soil stabilization, said cement containing essentially, in an amount effective to stabilizing the cement against the action of water and frost and increase the compressive strength, a mixture of highly branched, predominantly tertiary, saturated, aliphatic monocarboxylic acids having a carbon atom content of 5 to 20.

2. The cement of claim 1 in which the acid mixture is incorporated in an amount of about 0.05 to 2% by weight.

3. The cement of claim 1 in which the acids have a carbon atom content of 9 to 11.

4. The cement of claim 1 which comprises 0.1 to 0.5 by weight of the acid mixture.

5. The cement of claim 1 which comprises also 0.05 to 0.5% by weight and preferably 0.1 to 0.3% by weight of paraffin oil or wax.

6. The cement of claim 1 in which the acid mixture is present in a stabilizingly effective amount in the range of about 0.1 to about 0.5% by weight.

* * * * *